FIG. 2.
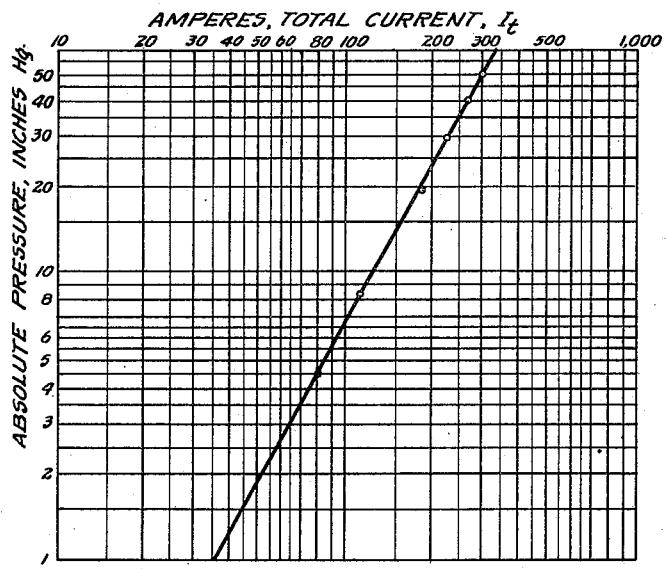
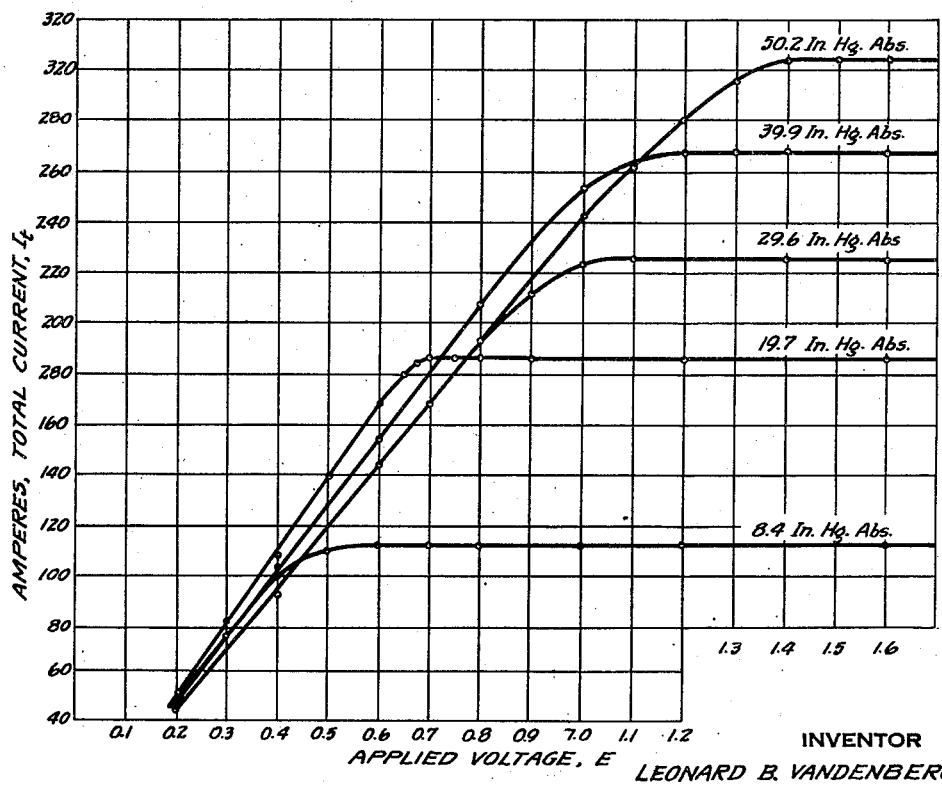
FIG. 3.

United States Patent Office
2,710,538
Patented June 14, 1955

2,710,538

ELECTROMAGNETIC PRESSURE GAGE

Leonard B. Vandenberg, Sharon Springs, N. Y., assignor, by mesne assignments, to the United States of America as represented by the U. S. Atomic Energy Commission Application January 16, 1953, Serial No. 331,654

1 Claim. (Cl. 73—398)

The present invention relates to indicating and controlling devices and in particular to an electromagnetic pressure gage in which pressure is indicated by the amount of current required to maintain a pressure equal and opposite to the pressure to be measured.

The development of liquid metal power and heat exchange systems has required the development of control devices analogous in function to those employed in hydraulic systems. It is an object of this invention to provide a versatile indicating device utilizing the electrical conducting properties of a liquid metal to develop liquid pressures suitable for use in a pressure gage or the like.

It is a further object of this invention to combine an automatic liquid rheostat with an electromagnetic pump for purposes of measuring or controlling pressures.

The foregoing objects are attained by providing an electromagnetic pump in which an end of the pump inlet tube is closed and the end of the pump outlet tube is open and immersed in liquid metal in a chamber, the pressure of which is to be measured. The pump armature current enters the inlet tube and leaves the pump by the outlet tube. The resistance of the tube will vary depending upon the extent to which it is filled by liquid metal. This feature provides an automatic rheostat which reduces the current flowing through the system to a constant value for constant pressures, notwithstanding variations in the impressed voltage.

The invention may be more completely understood by reference to the drawings: wherein:

Fig. 2 is a graph showing calibration of the gage of Fig. 1, relating the total current through the system with the absolute pressure developed therein.

Fig. 3 is a graph of performance of the gage of Fig. 1, and shows the total current through the system remains constant for constant pressures notwithstanding changes in voltage.

Figure 1:
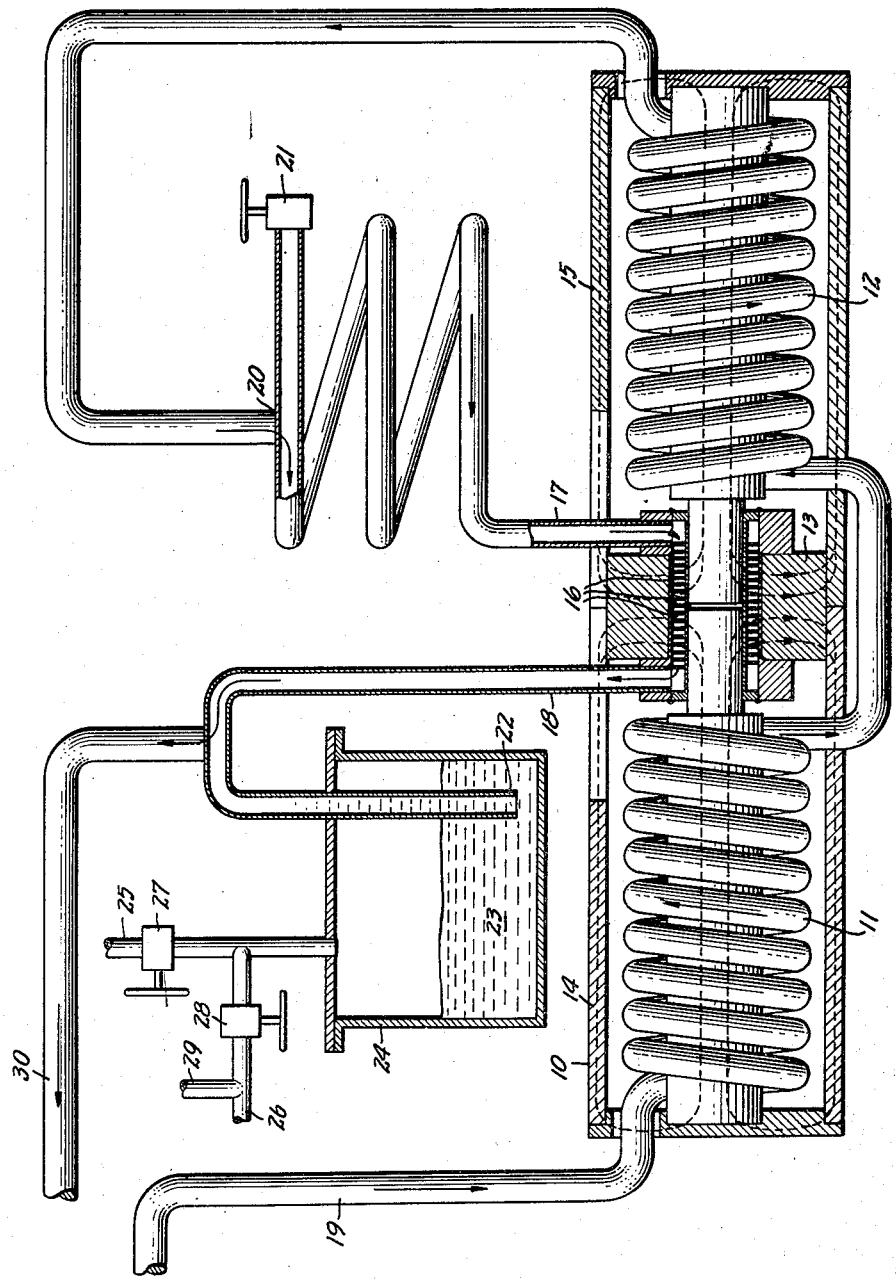
Fig. 1 is a cross sectional view of a pressure gage constructed in accord with this invention.

The gage shown in Fig. 1 consists of an electromagnetic pump substantially as described and claimed in my copending application Serial No. 331,653, filed January 16, 1953, entitled Liquid Metal High Pressure Pump. Briefly, this comprises a housing 10 which supports a pair of reversely wound electromagnets 11, 12 arranged in spaced end to end relationship. A split iron collar 13 and sections 14, 15 of iron pipe, complete flux paths for the electromagnets, which thus set up a radial magnetic field as indicated by broken lines in the figure. Intermediate the iron collar and the ends of the electromagnets is an annular pumping chamber subdivided by a plurality of fins 16 into spiral channels. A pump inlet 17 and outlet 18 communicate with the pumping chamber. In operation, alternating or direct current, entering through conductor 19 passes in series through the two electromagnets, thereby energizing them and setting up a radial magnetic field across the pumping chamber. The current then enters the liquid metal and inlet tube at 20 and provides the armature current for the pump. Interaction between this current and the radial magnetic field produces a force in the direction of the spiral channels which produces the desired pumping action. The total output of such a pump is the summation of the pressures contributed by each spiral.

The present invention utilizes a pump of the type described as an element in the pressure gage shown in Fig. 1. The pump inlet tube is bent into a coil and is provided with a vacuum tight closure, such as a valve 21. The end 22 of the outlet tube is open and immersed in liquid metal 23 in chamber 24, the pressure of which is to be measured. For purposes of calibration, the pressure chamber may be connected with a source of high pressure through line 25 or with a source of reduced pressure through line 26. Suitable valves 27, 28 in lines 25 and 26 are provided for connecting or disconnecting these lines with the pressure chamber, as desired. A line for a manometer may be included, as at 29.

In operation, assume that the voltage across the leads 19, 30 is zero and that there is a positive pressure in chamber 24. This pressure will then force liquid metal through opening 22 until the pump, together with the inlet and outlet tubes are completely filled therewith, valve 21 being opened during the filling operation to permit escape of unwanted gas. When a voltage is applied across the leads a current will begin to flow as shown in Fig. 3. The sloped lines to the left of this figure are in an area where there is insufficient current to oppose the pressure in the container, and the pump tube remains filled with liquid metal. As the voltage is increased the current increases and the pump may develop a pressure greater than that in the pressure chamber. When this happens, liquid metal is pumped from the coiled tube and into the pressure vessel. The electrical resistance of the tube will then increase because of the evacuation of liquid metal, and consequently the pump current is automatically reduced until an equilibrium condition is reached where only sufficient current will flow to balance the pumping pressure against the pressure in the pressure chamber. The equilibrium condition is clearly shown by the flat portion on the right of the graphs shown in Fig. 3. From this it may be seen that for a given pressure of mercury, the current through the pump remains constant notwithstanding that the voltage may vary. In a test conducted with a pump constructed as in Fig. 1, the pressure in the pressure chamber was kept constant and the voltage was changed abruptly from 1.6 volts to 2.33 volts. The current momentarily increased, but returned to its initial value after a period of about 20 seconds. A step decrease in voltage from 1.6 volts to 1.17 volts caused a momentary drop in current which returned to its initial value after an interval of approximately 7 seconds.

Another test was conducted with the gage wherein the pressure in the pressure chamber was abruptly increased from 18.16" Hg to 39.7" Hg. The current through the pump quickly increased and was again in equilibrium after a period of only 2.2 seconds.

From the foregoing it is apparent that the current through the system accurately indicates absolute pressure. This relationship is used to calibrate the present pressure gage. A calibration curve for a pump constructed according to this invention is shown in Fig. 2. Once the gage is calibrated, the absolute pressure in the chamber can be ascertained by noting the total current flowing through the system.

While the foregoing specific example describes a pressure gage, it is apparent that the device there disclosed may be readily adapted for use in a pressure controller, a level indicator or as a constant current controller. Also, by the addition of a suitable pressure transfer device, such as a bellows, on the pump outlet, the device may be adapted for use in non-metallic liquid and gas systems.

While the illustrated pump employs electromagnets in series to provide the necessary radial field, these may be replaced by permanent magnets. These would also maintain a linear relation between current and pressure and should give greater sensitivity since the field would be constant. The pressure would vary directly with the first power of the current rather than with the square of the current as in the case of a series field. If one were to hold the voltage constant, still greater sensitivity may be obtained by measuring the resistance across the tube as an indication of the pressure rather than by using the current for this purpose.

I claim:

An absolute pressure gage consisting of a high pressure electromagnetic pump of the type employing interaction between a magnetific field and an armature current to develop pressure in a liquid metal therein, a pump inlet tube having a closed end remote from the pump, said tube being filled at least in part with a conducting liquid metal, means for introducing armature current into the inlet tube and liquid metal adjacent the closed end thereof, said inlet tube and liquid metal therein constituting a liquid rheostat in the armature circuit, the resistance of said rheostat being a function of the level of liquid metal in said inlet tube, a chamber the pressure in which is to be measured, said chamber containing liquid metal, a single fluid line connecting the chamber with the pump, the said line being the pump outlet tube and having an open end immersed in the liquid metal in the pressure chamber, so that pressure in the chamber above the liquid level therein opposes pressure developed by the pump, whereby the pressure in the chamber is determined from the amount of current required to develop a pressure in the pump equal to that in said chamber.

References Cited in the file of this patent

UNITED STATES PATENTS

| | | |
|---|---|---|
| 1,190,044 | Thomson | July 4, 1916 |
| 2,669,873 | Gardner et al. | Feb. 23, 1954 |

OTHER REFERENCES

Kolin Review of Scientific Instruments, vol. 16, 1945, pp. 378 and 379.